Feb. 4, 1964  A. NATHAN ET AL  3,120,605

GENERAL PURPOSE TRANSISTORIZED FUNCTION GENERATOR

Filed Sept. 2, 1959  2 Sheets-Sheet 1

INVENTORS
AMOS NATHAN
JACOB KATZENELSON
BY
ATTORNEYS

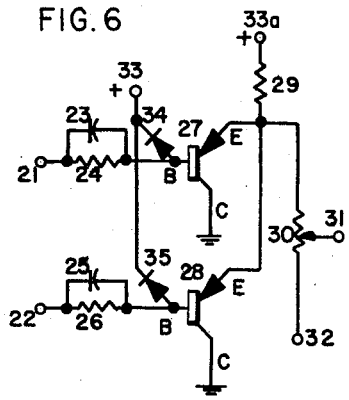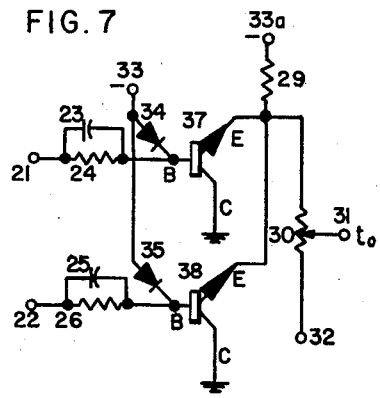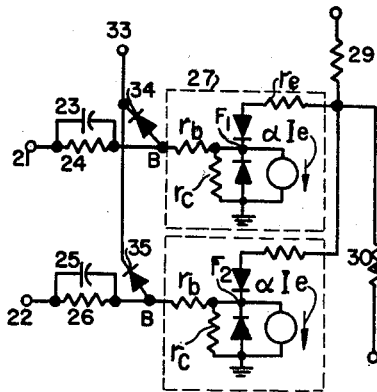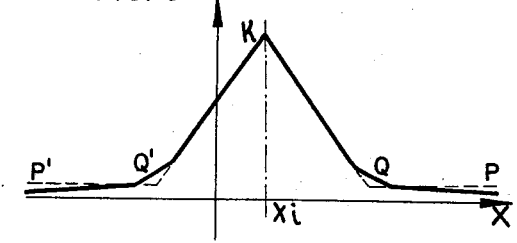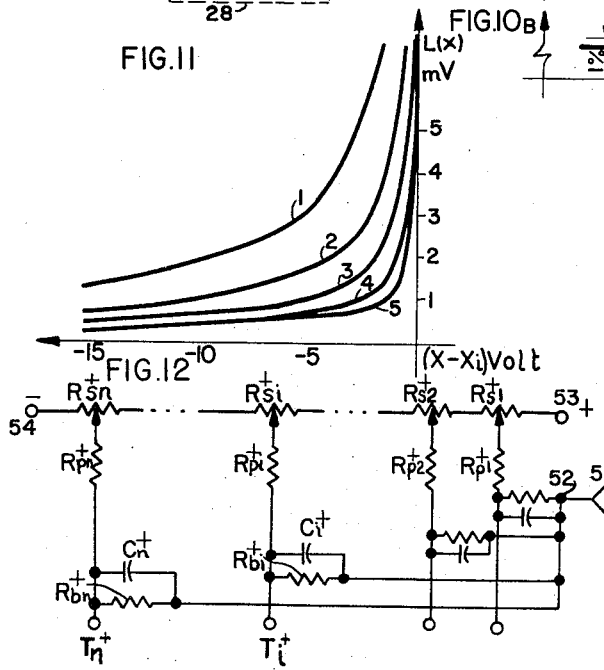
INVENTORS
AMOS NATHAN
JACOB KATZENELSON

United States Patent Office 3,120,605
Patented Feb. 4, 1964

3,120,605
GENERAL PURPOSE TRANSISTORIZED FUNCTION GENERATOR
Amos Nathan, Haifa, and Jacob Katzenelson, Tel-Aviv, Israel, assignors to Technion Research and Development Foundation Ltd., Haifa, Israel
Filed Sept. 2, 1959, Ser. No. 837,619
4 Claims. (Cl. 235—197)

This invention pertains to a general purpose piecewise-linear one dimensional function generator using transistors as non-linear elements and having an easily adjustable transfer characteristic; a transfer characteristic denoting the curve obtained by plotting the values of an output signal as a function of the input signal.

Function generators of arbitrary functions according to this invention are frequently required as generators of arbitrary voltages or in connection with analog computers. Another use of this invention is as an input unit to multivibrate interpolating function generators.

It is an object of this invention to provide an easily adjustable piecewise-linear function generator which stores given function values at equal intervals of the independent variable, having an accuracy compatible with the requirements of practical usage.

A further object of this invention is the provision of a function generator with independent adjustment of the stored function values.

Another object of this invention is the provision of compensating means in such a function generator for the improvement of its accuracy.

Yet another object of this invention is the provision of a convenient input device for such a function generator.

Still another object of this invention is the provision of an input device for interpolating multivariate function generators.

It is yet another object of this invention to provide a transistorized channel having high input impedance and low output impedance, for use in function generators.

It is still a further object of this invention to provide said channel making full use of the linear and non-linear characteristics of transistors and thus effecting a saving in the number of components.

It is still another object of this invention to provide embodiments of said channels in a novel configuration.

Other objects and advantages of this invention will become apparent from the following description taken in connection with the accompanying drawings in which, FIGURE 1 is a plot of a triangle function, i.e. of a basic transfer characteristic of one channel of the function generator of this invention;

FIGURE 6 is a schematic diagram of one embodiment of a channel $B_1$ of this invention;

FIGURE 7 is a schematic diagram of another embodiment of a channel $B_1$ of this invention;

FIGURE 8 is an equivalent schematic diagram of the circuit of FIGURE 5;

FIGURE 9 is a plot of an actual transfer characteristic of the embodiment of FIGURE 6;

FIGURE 10 illustrates the effect of compensation;

FIGURE 11 is an enlarged plot of the corner and shoulder regions of the transfer characteristic of a channel of this invention, with emitter resistance R as a parameter;

FIGURE 12 is a schematic diagram of one embodiment of an input unit of a function generator of this invention.

Let $f(x)$ be a given function of $x$. Then $F(x)$ is a piecewise-linear approximation of $f(x)$, where (1) $$F(x) = \sum_{i=0}^{n} f_i \Delta'(x - x_i)$$

where (2) $\Delta'(x-x_i) = \max[\min\{x-x_i+\Delta x, -(x-x_i)+\Delta x\}, 0]$ where:

$x$ = input variable;
$\Delta x$ = a constant;
$x_i$ = the value of $x$ at the $i$th sampling point;
Min, max are operator selecting the smallest, respectively largest, of the quantities upon which they operate;

$$f_i = F(x_i)$$

and the values of $f_i$ are so chosen that $F(x)$ is a good approximation to $f(x)$. Approximately, $$f_i \cong f(x_i)$$

The spacing of sampling points, $\Delta x$, is constant, and thus (3) $$x_i = x_0 + i\Delta x$$

where $x_0$ is a constant.

Figure 1:
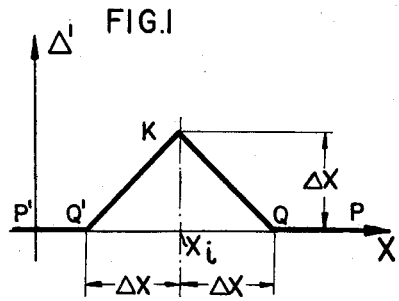

The function $\Delta'(x-x_i)$ is plotted in FIGURE 1. This function will be called the triangle function. K is the apex of the triangle and PQ, P'Q' are the shoulders of the triangle.

Figure 2:
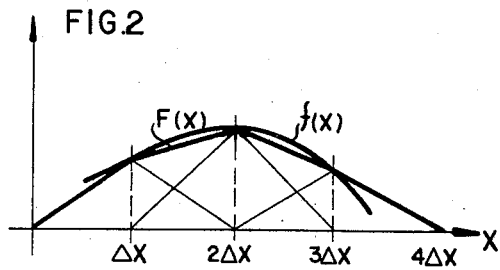
FIGURE 2 shows the combination of triangle functions to obtain the transfer characteristic of the complete function generator.

FIGURE 2 shows the production of $F(x)$ according to Equation 1 as the sum of products of triangle functions and suitable constants, yielding an approximation to $f(x)$.

A schematic diagram of a circuit of the prior art for the production of a triangle function multiplied by $f_1$ (where $f_1$ = constant) will be described in connection with FIGURE 3 in which 1 and 2 are the input terminals accepting input signals $(x-x_1)+\Delta x$ and $-(x-x_1)+\Delta x$, respectively. Diodes $D_1$ and $D_2$, with common output connection at terminal 5, select the larger of said input signals, which is produced at 5. Diodes $D_3$ and $D_4$ with common output connection at terminal 8, select the smaller of the signals appearing at 5 and zero or ground potential, to produce a primary output signal at 8. Potentiometer 9 produces at its adjustable contact 10 an output signal which is equal to the product of said primary output signal and a suitable constant the magnitude of which depends upon the setting of said potentiometer.

The prior art is described in the following references: T. E. Stern, "Piecewise-Linear Network Analysis and Synthesis," Proceedings of the Symposium on Nonlinear Circuit Analysis, Polytechnic Institute of Brooklyn, New York, 1956; F. Spada, S.B. Thesis, M.I.T., Cambridge, Mass., 1955.

Figure 3:
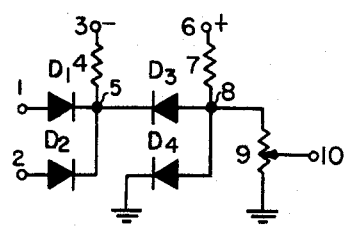
FIGURE 3 is a schematic diagram of the basic circuit of the prior art for the production of a triangle function.
Figure 4:
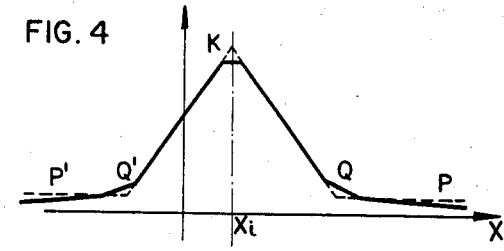
FIGURE 4 is a plot of the transfer characteristic of the circuit of FIGURE 3.

The actual transfer characteristic of a circuit such as that of FIGURE 3 differs from the exact triangle function. As shown in FIGURE 4, the deviations from the triangle function are as follows:

(1) The apex and the shoulders are cut off, in the regions around K, and Q, Q', respectively.
(2) The shoulders of the triangle are not at zero height.
(3) The shoulders are not horizontal, i.e. they do not correspond to a constant output signal (regions QP, Q'P').

These deviations cause serious errors, and prior embodiments of function generators, with units such as that of FIGURE 3, are therefore quite unsuited to practical use.

The cutting of the apex is greater than that at the shoulders. If, for example, the function generator of the prior art is adjusted to produce a constant output, the transfer characteristic will show peaks corresponding to the apexes of the triangles. The corresponding errors are about five percent of the output signal, as shown in FIGURE 10A, where the spiked portion of F(x) is due to the apex K of the triangle function (see FIGURE 1) which is summed with the rounded shoulders Q and Q' (see FIGURE 4) of the adjacent triangles. The true curve is shown by dotted line 100.

Because the shoulders do not produce a zero output signal, the output of the circuit of FIGURE 3 depends upon the setting of its potentiometer 10 even when variable $x$ is in the region of the shoulders. This results in an interdependence of the adjustments of the sampling point function values, $f_i$.

This invention provides means for the production of a function according to Equation 1 embodying transistor means as non-linear and linear elements, with an accuracy compatible with technical requirements.

Figure 5:
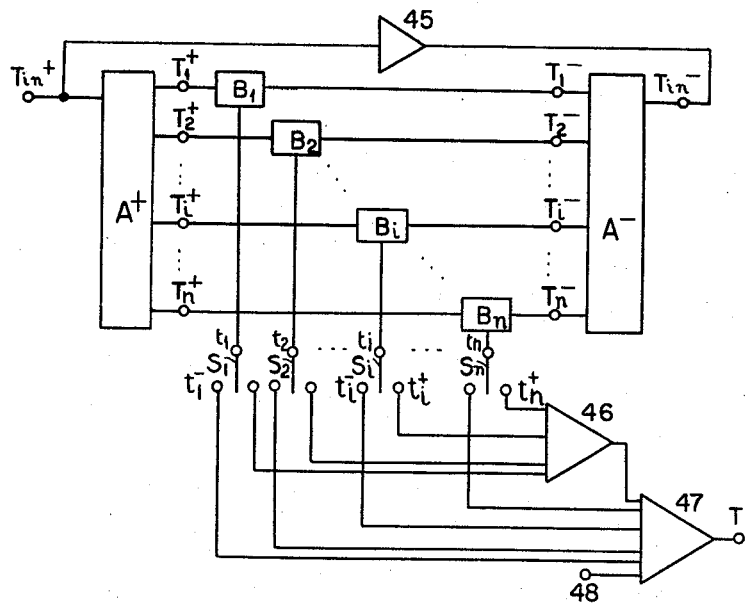
FIGURE 5 is a block diagram of a complete function generator embodying channels of this invention.

One embodiment of a function generator of this invention will be described in connection with the block diagram of FIGURE 5 in which the input unit consists of blocks $A^+$ and $A^-$ and sign changing amplifier 45 which has unity gain. The variables are represented by voltages. Input voltage $x$ is accepted by input terminal $T_{in}^+$ and fed to block $A^+$ whose output terminals are $$T_i^+; \quad i=1, 2, \ldots, n$$

$A^+$ produces at $T_i^+$ a voltage which is approximately equal to (4) $\quad (x-x_i)+\Delta x$ where $x_i = x_0 + i\Delta x$; $i = 1, 2, \ldots, n$; for the instantaneous value of $x$, where $x_0$ is a constant voltage.

$T_{in}^+$ is also connected to the input terminal of sign changer 45 which produces a voltage equal to $-x$ at input terminal $T_{in}^-$ of $A^-$. $A^-$ produces a voltage approximately equal to (5) $\quad -(x-x_i)+\Delta x$ at terminal $T_i^-$; $i=1, 2, \ldots, n$; for the instantaneous value of $x$. Block $B_i$; $i=1, 2, \ldots, n$; is fed from terminals $T_i^+$ and $T_i^-$, and produces from its input voltages a primary output voltage equal to (6) $\quad e_0 = K_i \Delta'(x-x_i)$ at terminal $t_i$ where $K_i$=constant. $t_i$ is connected to switch $S_i$ connecting $t_i$ either to terminal $t_i^+$ or to terminal $t_i^-$. $t_i^+$, $t_i^-$, are the input terminals to sign changing adders 46, 47, respectively. 46 is a sign changing adder of unity gain, producing at its output terminal the negative of the sum of its input signals. Terminals $t_i^-$, the output terminal of adder 46, and terminal 48, are connected to the input of sign changer 47 which produces at output terminal T an output signal proportional to F(x), Equation 1. Terminal 48 is supplied with a suitable constant voltage. Switch $S_i$ permits the selection of positive and negative values of $f_i$.

One embodiment of a triangle channel of this invention will be described in connection with FIGURE 6, said channel being a suitable embodiment of a channel $B_i$ of the block diagram of FIGURE 5. In FIGURE 6, 21, 22 are the input terminals, accepting signals approximately equal to $$(x-x_1)-\Delta x$$
$$-(x-x_1)-\Delta x$$

respectively, which are suitable linear functions of the variable $x$. Said channel then produces at terminal 31 an output voltage approximately equal to $f_i \Delta'(x-x_i)$, where $f_i$ is a constant which depends upon the setting of potentiometer 30. $\Delta'(x-x_i)$ is plotted in FIGURE 1.

The signals at 21, 22, are fed through the parallel combination of capacitors and resistors 23, 24, and 25, 26, to the base connections of PNP transistors 27, 28, respectively. Each transistor base is connected to the anodes of a limiting diode, 34, 35, in this example, whose cathodes are connected to a common suitable D.C. voltage at 33. Said diodes are omitted in some embodiments of this invention.

The collectors C of said transistors are grounded and their emitters E have a common output connection which is also connected through resistor 29 to a positive D.C. potential at terminal $+33a$. Terminals E are connected to the potentiometer 30 whose other terminal 32 is connected to ground or to a suitable small constant compensating voltage. Adjustable contact 31 provides the output terminal of the channel.

Similarly, FIGURE 7 is a schematic diagram of an inverted triangle channel, producing the negative of $\Delta'(x-x_1)$ when fed with suitable input voltages. In FIGURE 7 the limiting diodes are reversed, the PNP transistors 27, 28 are replaced by NPN transistors 37, 38 and the voltages at $33a$ and 32 and 33 are reversed in polarity. As the configuration and operation of the circuit of FIGURE 7 is analogous to that of FIGURE 6, only the latter will be described in the sequel.

The operation of the embodiment of FIGURE 6 will be described in connection with the schematic diagram of FIGURE 8 which is equivalent to it. FIGURE 8 differs from FIGURE 6 in that each transistor has been replaced by a standard representation as a combination of ideal diodes, a current source and resistors. Said current sources withdraw currents $\alpha I_e$ from nodes $F_1$, $F_2$, where $\alpha$ is the current amplification factor of the transistors and $I_e$ are the emitter currents of transistors 27, 28, respectively. $r_b$, $r_e$ and $r_c$ are the internal base, emitter and collector resistances, respectively.

$r_c$ is in general so large that it can be disregarded in the following analysis.

In an ideal transistor $\alpha=1$, $r_e=0$. In this idealized case, for positive input potentials $e_{i1}$, $e_{i2}$ the potentials at $F_1$, $F_2$ are qual to $e_{i1}$, $e_{i2}$, respectively. Therefore the equivalent emitter diode associated with the channel having lower input potential conducts, whereas the equivalent emitter diode associated with the other channel is cut off. At all times the output potential $e_0$ at $t_0$ is therefore equal to the smaller of $e_{i1}$ and $e_{i2}$. Input capacitors 23, 25, are provided in order to improve the frequency response of the circuit.

Positive $e_{i1}$, $e_{i2}$ corresponds to the region QQ', FIGURE 1. For negative $e_{i1}$ and $e_{i1}<e_{i2}$ the collector diode of 27 conducts and thus shunts terminal $F_1$ to ground, corresponding to region P'Q', FIGURE 1. Similarly, negative $e_{i2}$ and $e_{i2}<e_{i1}$ corresponds to QP, FIGURE 1. Ideally, the exact triangle function P'Q'KQP, FIGURE 1, is thus produced. P'Q', QP will be called the shoulders of said function, Q' and Q being its corners, and K being its apex.

In the region QQ', FIGURE 1, a better approximation of analysis is obtained with $r_e \neq 0$ and $\alpha \neq 1$ but assuming $R_1 = R_2$, where $R_1$, $R_2$ are the resistances of resistors 24, 26, respectively, and (7) $\quad R \gg r_e$ (8) $\quad R \gg (1-\alpha)(R_1+r_e r_b)$ and $r_c$ is very large with respect to all other circuit resistances, said approximation being (9) $\quad e_o = e_{im} + \dfrac{(1-\alpha)(r_b+R_1)+r_c}{R}V$ where $m=1$ or $m=2$ for $e_{i1}<e_{i2}$ or $e_{i2}<e_{i1}$ respectively, where V is the potential at $33a$. The output signal is therefore always equal to one of the two input signals, however the output signal is at a slightly different voltage level than the input signal. The difference in levels is given by the second expression on the right hand side of Equation 9.

In the shoulder regions P'Q', QP, the output voltage will not be exactly zero, in the non-ideal case.

An actual transfer characteristic of the circuit of FIGURE 6 will be described in connection with FIGURE 9, which is a plot of output voltage at terminal E, versus input voltage $x$. With a special choice of circuit values, it is possible to reduce the errors thus caused by said non-ideal transfer characteristic so that the combined errors of a function generator embodying channels of this invention are of the order of one percent, as required in technical applications.

As shown in FIGURE 9, the deviations from the ideal triangle function are as follows:

(1) The apex and the shoulders are rounded off in the regions around K, and Q, Q', respectively.
(2) The shoulders of the triangle are not at zero height.
(3) The shoulders are not horizontal, i.e. they do not correspond to a constant output signal (regions QP, Q'P').

The rounding off of the shoulders is greater than that at the apex. If, for example, a complete function generator using said triangle channels is adjusted to produce a constant output, the transfer characteristic will show peaks corresponding to the apexes of the triangles as shown in FIGURE 10A, when adjusted to produce constant output.

Because the shoulders do not correspond to zero output signal, the output of the complete function generator depends upon the setting of the potentiometer of a channel even when variable $x$ is in the region of the shoulders of the transfer characteristic of said channel. This results in an interdependence of the adjustments of the sampling point function values, $f_i$. The rounding off of triangle corners and the transfer characteristic of a channel of this invention in the shoulder region is plotted in FIGURE 11 as a function of emitter resistance R, R being the resistance of resistor 29, FIGURE 6.

FIGURE 11 shows the characteristic curves which correspond to the circuit of FIGURE 6 with the following components and component values:

Transistors 27, 28 are of type 2N422;
Resistors 24, 26 are 2.2 kilohms;
Capacitors 23, 25 are 100 picofarad;
Potentiometer 30 is of 50 kilohms;
Voltage at 28, $V=22.5$ volts;
Terminal 32 is grounded.

In FIGURE 11 curves 1, 2, 3, 4, 5 correspond to values of R equal to 47, 100, 220, 470, 1000 kilohms, respectively.

Increasing R is seen to increase the accuracy, but it also increase the output impedance at terminal E, which is undesirable in many applications. One example of a channel of this invention uses a value of $R=100$ kilohms yielding an output impedance at E of 200 ohms. The input impedance to said channel is never less than 2.2 kilohms, in this example. Said value of R is much larger than the values of R used in circuits of similar configurations which are used in logical circuits, for example.

The peaks in the transfer characteristic of a complete function generator described above and illustrated in FIGURE 10A can be reduced by increasing the rounding off of the apex of said triangle function so that it compensates for the rounding off of the corners, when said function generator produces a constant function resulting in an output signal as plotted in FIG. 10B. An additional advantage of rounded off corners is the fact that the sensitivity of said function generator to small errors in the values of $x_i$ is decreased, thus facilitating the adjustment of the function generator.

One embodiment of this invention for said rounding off of the triangle function in the circuits of FIGURES 6 and 7 uses limiting diodes 34 and 35 which are connected to the bases of transistors 27, 28, respectively, in FIGURE 6, and 37, 38, respectively, in FIGURE 7, and to suitable D.C. potentials, so as to limit the output voltage so that said apex is rounded off.

Another object of said diodes is the limitation of the base voltage of each transistor, when operating in its cut-off region. Said limitation does not affect the output voltage but increases the permissible range of input voltage for a transistor with given maximum ratings.

A single limiting diode connected to the common emitter connection E could also be used to produce the rounding off of said apex.

This invention also provides compensating means for the non-zero output signal of a channel in the shoulder region. One embodiment of such compensation uses a small positive D.C. potential at terminal 32, FIGURE 6, equal to the average potential at E in the shoulder region. In said example, with $R=100$ kilohms, said voltage is of the order of 1 millivolt. In the shoulder region the voltage difference at the terminals of potentiometer 30 is therefore reduced, on the average, and therefore the influence of the setting of said potentiometer on the output voltage in said region is also reduced. Using this method of compensation, the output signal is at a constant D.C. level which is equal to said compensating voltage. In a complete function generator using such compensated channels, the level of the output signal of said function generator is readily readjusted to zero by adding to it a suitable constant voltage.

Another embodiment of compensation for shoulder level consists in connecting terminal 32, FIGURE 6, to ground potential and connecting collectors C to a small negative D.C. potential, rather than to ground potential. In this case the level of output signal at 31 is not set off with respect to zero.

One embodiment of an input device of this invention providing the required input voltage to embodiments of said triangle channels will be described in connection with FIGURE 12, said input unit being a suitable embodiment of block A+, FIGURE 5. Equations 4 and 5 show that the input terminals of a channel such as 21, 22, FIGURE 6, must be fed by a linear combination of a constant potential and $x$. Said linear combination can be produced by a linear resistive network. In FIGURE 12, the series combination of potentiometers $R_{si}^+$ is connected between suitable constant voltages at terminals 53 and 54, thus providing a monotonic sequence of voltages at the adjustable contacts of successive potentiometers $R_{si}^+$. Terminal 50 is fed with voltage $x$. Impedance converter 51 has high input impedance and provides said voltage $x$ at a low impedance level at terminal 52. Any terminal $T_i^+$ is connected through resistors $R_{pi}^+$ to the adjustable contact of $R_{si}^+$ and through the parallel combination of resistor $R_{bi}^+$ and capacitor $C_i^+$ to terminal 52. $T_i^+$ is directly connected to base terminal B of transistor 27 (see FIGURE 6). With suitable resistance values and a suitable adjustment of potentiometers $R_{si}^+$, the required signal appears at $T_i^+$. The base input impedance, which is the impedance of the parallel combination of capacitor 23 and resistor 24 in FIGURE 6, is provided by the impedance looking into the input device of FIGURE 12 from terminal $T_i^+$. In this example the circuit values are such that the adjustment of a potentiometer does not appreciably affect the gain of the $x$ signal, i.e. the gain from terminal 50 to terminal $T_i^+$.

One example of a complete function generator of this invention, using the block diagram of FIGURE 5 and a plurality of channels of FIGURE 6 without their base resistors and capacitors, and the input device of FIGURE 12 is as follows:

Twenty one equally spaced sampling points are provided, i.e. $i=1, 2, \ldots, 21$;

$\Delta x = 1$ volt;
$x_{21} = -10$ volts;
$x_1 = 10$ volts;

Voltages at 53, 54 are 110 volts, −110 volts, respectively;

$R_{bi}^+ = 2.2$ kilohms, for all $i$;
$C_i^+ = 1000$ picofarads, for all $i$;
$R_{pi}^+ = 22$ kilohms, for all $i$;
For $i = 1, 2, 20, 21$; $R_{si}^+ = 100$ ohms;
For $i = 3, 4, 18, 19$; $R_{si}^+ = 110$ ohms;
For $i = 5 \div 17$; $R_{si}^+ = 120$ ohms.

Although this invention has been described and illustrated in detail it is to be clearly understood that the same is by way of illustration and example only and is not to be taken by way of limitation, the scope of this invention being limited only by the terms of the appended claims.

What is claimed is:

1. A generator for the use in a piecewise linear approximation analog system comprising first means for producing a triangle function $\Delta'(x-x_i)$ or $-\Delta'(x-x_i)$, of a variable $x$, where $\Delta'(x-x_i) = \max\{\min[(x-x_i)+\Delta x, -(x-x_i)+\Delta x], 0\}$ for any instantaneous value of $x$, where $x_i$ and $\Delta x$ are constants, said first means including first and second transistors connected in common emitter fashion, second and third means connected to said first and second transistors respectively, for rounding off the apex region of said triangular function, fourth means connected to said first and second transistors for controlling the rounding off of the shoulder regions of said triangle function to compensate for the rounding off of the apex of the triangle function, said first and second transistors being adapted to produce said shoulder regions by saturation of one of said transistors and to produce the triangular region of said function by linear operation of one of said transistors while the other is cut off, said second and third means including first and second semiconductor devices respectively, connected to the base electrodes of said first and second transistors respectively and bias means connected to said semiconductor devices for improving the approximation of $\Delta'(x-x_{i-1}) + \Delta'(x-x_i) + \Delta'(x-x_{i-1})$ to a constant in the interval $x_{i-1} < x < x_{i+1}$ where $x_i = x_0 + i\Delta x$ and $x_0$ is a constant.

2. A generator for the use in a piecewise linear approximation analog system comprising first means for producing a triangle function $\Delta'(x-x_i)$ or $-\Delta'(x-x_i)$, of a variable $x$, where $\Delta'(x-x_i) = \max\{\min[(x-x_i)+\Delta x, -(x-x_i)+\Delta x], 0\}$ for any instantaneous value of $x$, where $x_i$ and $\Delta x$ are constants, said first means including first and second transistors having their emitter electrodes connected in common, load impedance means connected to said common emitter connection; constant voltage means connected to said load impedance means; said constant voltage means and said load impedance means being selected to cause said transistor means to operate linearly in the operating region between cutoff and saturation; second and third diode means connected to said first and second transistors respectively, for rounding off the apex region of said triangular function.

3. A generator of the type described in claim 2 wherein said first and second transistors being adapted to produce said shoulder regions by saturation of one of said transistors and to produce the triangular region of said function by linear operation of one of said transistors while the other is cutoff.

4. A generator of the type described in claim 2 further comprising potential dividing means connected to said common emitter connection for reducing the magnitude of the output voltage appearing at the common emitter terminal, said potential dividing means being adapted to permit manual adjustment of said potential dividing means.

References Cited in the file of this patent

UNITED STATES PATENTS

| | | |
|---|---|---|
| 2,956,182 | Norman | Oct. 11, 1960 |
| 2,989,652 | Hall | June 20, 1961 |

OTHER REFERENCES

Palimpest on the Electronic Analog Art, edited by H. M. Paynter, Sc. D., R.P.E., printed by Geo. A. Philbrick, Researcher, Inc., 1955. (Copy in Div. 23.)